United States Patent [19]

Nakazato

[11] Patent Number: 4,711,756
[45] Date of Patent: Dec. 8, 1987

[54] CONTROL ROD DISPLACEMENT

[75] Inventor: Susumu Nakazato, Tokyo, Japan

[73] Assignee: Westinghouse Electric Corp., Pittsburgh, Pa.

[21] Appl. No.: 18,820

[22] Filed: Feb. 24, 1987

Related U.S. Application Data

[63] Continuation of Ser. No. 763,722, Aug. 8, 1985, abandoned.

[51] Int. Cl.⁴ .............................................. G21C 7/10
[52] U.S. Cl. .................................... 376/327; 376/223; 376/233
[58] Field of Search ................ 376/327, 333, 223–225, 376/233, 353

[56] References Cited

U.S. PATENT DOCUMENTS

| | | | |
|---|---|---|---|
| 2,852,458 | 9/1958 | Dietrich et al. | 376/223 |
| 3,480,510 | 11/1969 | Anthony | 376/353 |
| 3,486,975 | 12/1969 | Ripley | 376/327 |
| 3,720,580 | 3/1973 | Schabert et al. | 376/233 |
| 3,751,336 | 8/1973 | Angelini et al. | 376/327 |
| 3,853,699 | 12/1974 | Frisch et al. | 376/233 |
| 3,857,599 | 12/1974 | Jones et al. | 376/233 |
| 3,979,258 | 9/1976 | Schweiger et al. | 376/327 |

FOREIGN PATENT DOCUMENTS

| | | |
|---|---|---|
| 0060778 | 9/1982 | European Pat. Off. . |
| 0088945 | 9/1983 | European Pat. Off. ............ 376/327 |
| 0128091 | 12/1984 | European Pat. Off. . |
| 1151607 | 7/1963 | Fed. Rep. of Germany ...... 376/327 |
| 1217059 | 5/1960 | France . |
| 1491552 | 11/1977 | United Kingdom . |

Primary Examiner—Harvey E. Behrend
Attorney, Agent, or Firm—Daniel C. Abeles

[57] ABSTRACT

In a nuclear reactor including a core, a plurality of control rods, a support supporting the control rods and movable for displacing the control rods in their longitudinal direction between a first end position in which the control rods are fully inserted into the core and a second end position in which the control rods are retracted from the core, and guide elements contacting discrete regions of the outer surface of each control rod at least when the control rods are in the vicinity of the second end position, the control rods being longitudinally movable relative to the guide elements to thereby cause the outer surface of the control rods to experience wear as a result of sliding contact with the guide elements, there is provided a displacement device operatively coupled to the control rods for periodically rotating the control rods in order to change the locations on the outer surfaces of the control rods at which the control rods are contacted by the guide elements.

9 Claims, 7 Drawing Figures

CONTROL ROD DISPLACEMENT

This application is a continuation, of application Ser. No. 763,722 filed Aug. 8, 1985, now abandoned.

BACKGROUND OF THE INVENTION

Known nuclear reactors, such as pressurized water reactors, include control rods that contain neutron absorbers with varying absorption capability for shutdown or power level control and sometimes also non-neutron absorbing materials to first breed plutonium and to later burn it as a fuel component.

Generally, these rods are mounted, via their upper end, to an assembly, or spider, which supports a plurality of such rods from simultaneous movement into and out of the reactor active core region. While in the core region, the control rods enter fuel assembly thimbles.

The assembly of a spider and a plurality of control rods may be designated a rod cluster control or a water displacer rod assembly, depending on the function to be performed by the control rods.

During reactor operation, the control rods are withdrawn from the active core region by lifting the assembly into the upper internals of the reactor pressure vessel. Movements of the assembly are guided by a guide tube presenting a plurality of guide sections, or cards, which contact the rods in respective regions. The number of guide sections provided for each control rod is selected as a compromise between the desire to reduce drag forces, which entails a minimum number guide sections, and the need to reduce the distance between guide sections in order to limit the amplitude of flow-induced vibration forces.

Drag forces can be controlled by design approaches which limit the drag forces, and thus reduce drag friction, by a hydraulic pressure balance.

The drag which does exist is a source of wear along each rod surface which slides along a guide section. In addition, when the rods are being maintained in their raised position in the guide tube, they experience movement relative to the guide sections due to flow induced vibration, which movement is a further cause for wear.

Such wear can influence the useful life of the control rods.

The rate of such wear is partly determined by the materials of the control rods and guide sections. The latter are usually made of stainless steel, while neutron absorber control rods are generally sheathed in stainless steel and water displacer rods are sheathed in a non-neutron absorbing material such as zircalloy.

Thus, wear imposed on neutron absorbing rods occurs primarily during insertion and withdrawal movements. In the case of water displacer rods, movements are limited, but since the material is softer, these rods are more susceptible to wear due to flow induced vibration while the rods are in their raised, or parked, position.

Once the outer wall of a control rod has been worn to a certain depth at one location, the rod must be replaced. Therefore, if such wear can be retarded, the useful life of the spider-rod assembly can be increased.

SUMMARY OF THE INVENTION

It is an object of the invention to increase the useful life of such rods.

Another object of the invention is to distribute the wear occurring at the outer surface of the rods so that the rate at which a defined surface layer of each rod is worn away is reduced.

These and other objects are achieved, according to the invention, in a nuclear reactor including a core, a plurality of control rods, support means supporting the control rods for movement in the longitudinal direction of the control rods between a first end position in which the control rods are fully inserted into the core and a second end position in which the control rods are retracted from the core, and guide means contacting discrete regions of the outer surface of each control rod at least when the control rods are in the vicinity of the second end position, the control rods being longitudinally movable relative to the guide means to thereby cause the outer surface of the control rods to experience wear as a result of sliding contact with the guide means, by the improvement constituded by displacement means operatively coupled to the control rods for periodically rotating the control rods in order to change the locations on the outer surfaces of the control rods at which the control rods are contacted by the guide means.

DESCRIPTION OF THE PREFERRED EMBODIMENTS

Figure 1:
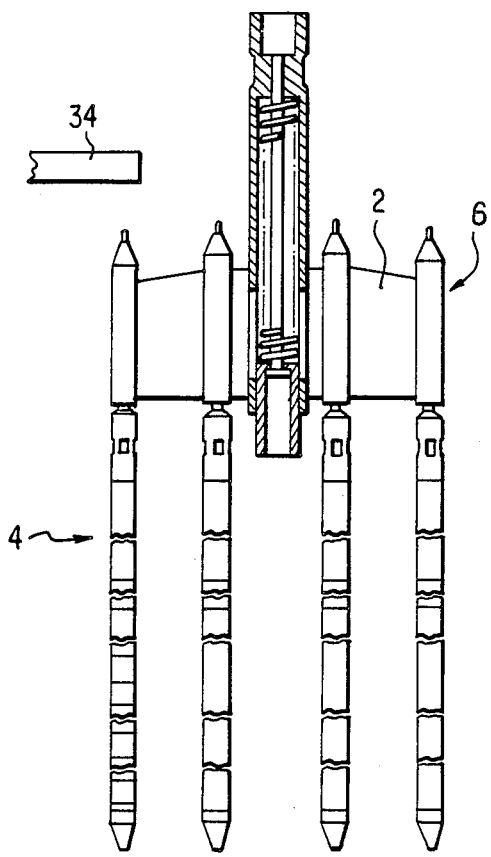
FIG. 1 is an elevational view, partly in cross-section, of a rod and spider assembly incorporating one preferred embodiment of a rod displacement arrangement according to the invention.

FIG. 1 is an elevational view of a typical rod and spider assembly which can be constructed according to the present invention.

Figure 2:
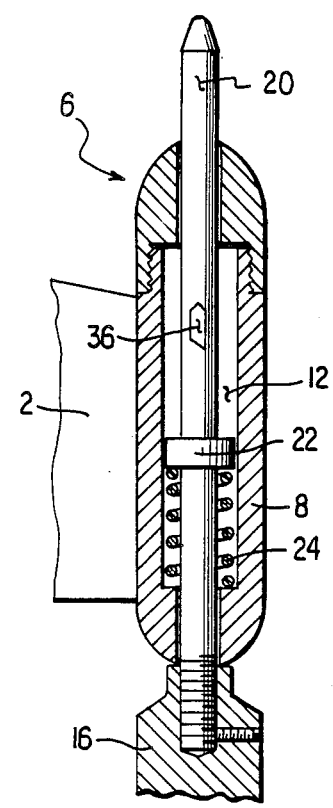
FIG. 2 is a cross-sectional detail view of a portion of the embodiment of FIG. 1.

This assembly includes a spider 2 which supports a plurality of rods 4 for vertical movement as needed to achieve the required reactor control. Each rod is supported on spider 2 via a respective support unit 6, one embodiment of which is shown in FIG. 2.

The support unit 6 is composed of a housing 8 and a housing cap 10 which together delimit a cylindrical chamber 12. Each control rod 4 is connected to an extension piece 16 into which is threaded a support rod 20 that extends vertically through unit 6 and its chamber 12 and is movable axially relative to unit 6.

A ring 22 is fixed to rod 20 and a compression spring 24 is interposed between ring 22 and the bottom wall of chamber 12. Thus, rod 20 is supported by unit 6 via spring 24.

Reverting to FIG. 1, when the assembly composed of spider 2 and rods 4 is raised into the upper internals of the reactor vessel in order to withdraw rods 4 from the active core region of the reactor, each rod 4 is guided by guide sections or cards 30 (note: this reference numeral must be added to FIG. 1), which are spaced apart around the associated rod 4. Contact between each rod 4 and its associated guide sections or cards 30 produces drag forces whenever rods 4 are raised or lowered. These drag forces, of course, produce a certain amount of wear on the outer surface of the rod 4.

As the assembly 2, 4 arrives at its uppermost position, the upper end of each support rod 20 comes to abut against a stop 34 installed in the guide tube and positioned so that when assembly 2, 4 is in its uppermost position, each ring 22 will have been pushed downwardly in chamber 12 from the position illustrated in FIG. 2 and spring 24 will be essentially fully compressed.

According to the present invention, this downward movement of ring 22, together with support rod 20, extension piece 16 and the associated rod 4 will be accompanied by a rotation relative to housing 8. This rotation will change the locations of each rod 4 which are in contact with its associated guide sections or cards.

Figure 3:
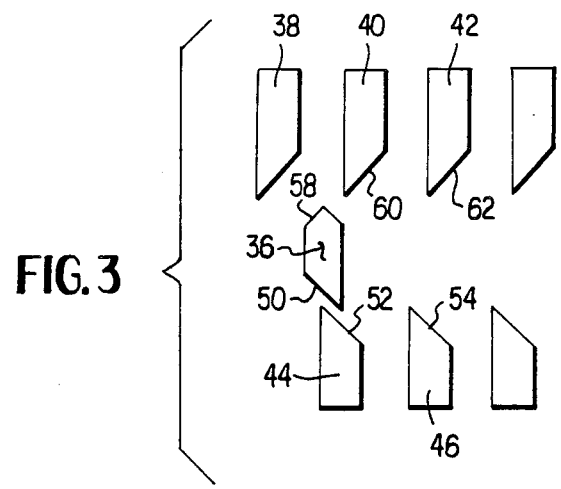
FIG. 3 is a developed, detail view of a camming structure employed in the embodiment of FIG. 2.

One suitable mechanism for effecting the desired rotation is illustrated in developed form in FIG. 3. This mechanism includes a boss 36 on the outer surface of support rod 20, as well as a group of upper bosses 38, 40, 42 . . . and a group of lower bosses 44, 46 . . . provided on the wall of chamber 12 and extending around the periphery thereof. Boss 36 is provided with a lower camming surface 50 arranged to cooperate with guide surfaces 52, 54 on lower bosses 44, 46, respectively. In addition, boss 36 is provided with an upper camming surface 58 arranged to cooperate with guide surfaces such as 60, 62 on upper bosses 40, 42, respectively.

Rotation of support rod 20, together with extension piece 16 and the associated control rod is effected each time the assembly 2, 4 is raised into the parked position and then lowered again into the reactor core. When the assembly reaches its uppermost position, the upperend of each support rod 20 is halted by its associated stop member 34. Spider 2 and housings 8 then continue to move upwardly over a short distance relative to support rods 20 so that camming surface 50 of cam 36 slides along guide surface 52, thereby effecting an incremental rotation of support rod 20. Thus, cam 36 comes into alignment with the gap between lower bosses 44 and 46.

Then, when spider 2 is again lowered, each support rod 20 initially remains in contact with its associated stop 34 so that each housing 8 moves downwardly relative to its associated rod 20 as spring 24 expands. During this time, camming surface 58 will slide upwardly along guide surface 60 of upper boss 40, thereby effecting a further incremental rotation of support rod 20 and bringing boss 36 into alignment with the gap between upper bosses 40 and 42.

According to one embodiment of the invention, the total rotation imparted to rod 20 by the sliding movement along surfaces 52 and 60 will be of the order of 45 degrees. Then, when the assembly is lowered into the reactor core, each control rod 4 will have an angular position which is offset by 45 degrees from the previous position. As a result, each guide section, or card will contact a new surface area of its associated rod 4, at a location which is angularly offset from the surface area which it previously contacted.

Figure 4:
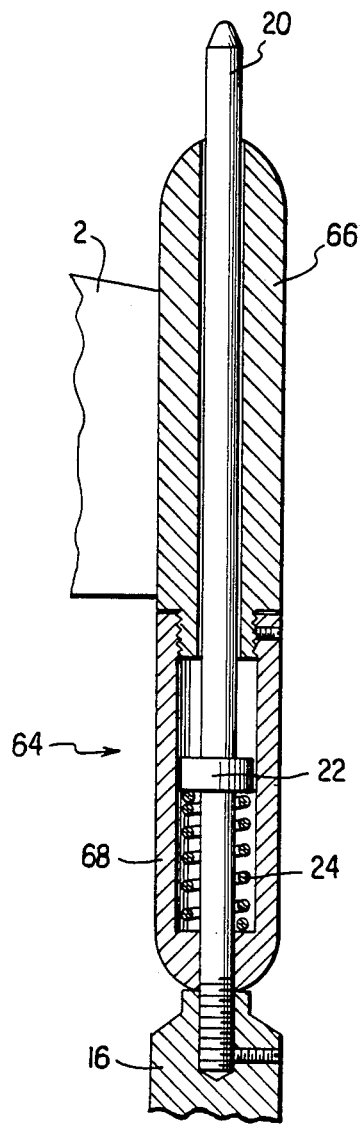
FIG. 4 is a view similar to that of FIG. 2 illustrating a second embodiment of the invention.

FIG. 4 illustrates an alternative rod support unit 64 which includes a top end plug 66 fastened to spider 2 and having an axial passage for support rod 20. A housing 68 is screwed onto the bottom of plug 66 and is then secured thereto by a locking pin. This embodiment allows for a larger space within housing 68 to accommodate a larger spring 24 and facilitate formation of bosses, such as 38, 40, etc of FIG. 3, on the inner wall of housing 68.

Figure 5:
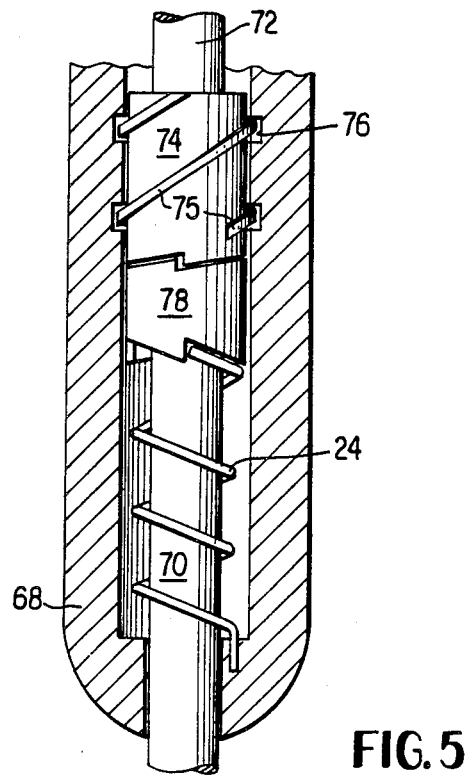
FIG. 5 is a cross-sectional detail view illustrating a third embodiment of the invention.

FIG. 5 illustrates a second embodiment of a mechanism for rotating each rod in accordance with the present invention. This embodiment includes a housing 68 having the same form as that shown in FIG. 4. However, one advantage of the structure illustrated in FIG. 5 is that the interior of housing 68 need not be provided with bosses, such as 38, . . . In this embodiment, the control or water displacer rod is supported by means of a support rod 70 which, in turn, is supported in housing 68 by means of compression spring 24. Extending downwardly into housing 68 is a drive rod 72 which extends upwardly through the top end plug connected to rod 68, the top end plug being as shown in FIG. 4 and not being illustrated in FIG. 5. The upper end of drive rod 72 is disposed to engage the stop 34 shown in FIG. 1. The lower end of drive rod 72 carries a rotation producing member 74 provided with two individual, angularly offset external threads 75 which engage in helical recesses 76 in the inner wall of housing 68. The lower end of member 74 has an annular sawtooth structure composed of vertical surfaces alternating with gradually sloping surfaces.

Fixed to the upper end of support 70 is a disk 78 having, at its top, a sawtooth structure constructed to mate with the sawtooth structure at the lower end of member 74. The lower end of disc 78 is equally provided with an annular sawtooth structure composed of vertical surfaces alternating with inclined surfaces, with these inclined surfaces being inclined in the opposite direction to the gradually sloping surfaces at the upper end of disk 78.

In the normal operating state, when spider 2 is spaced from the retracted position, spring 24 is in its elongated state and presses disk 78 against member 74, so that member 74 and drive rod 72 are equally supported by spring 24. The spider is lifted into its retracted position, and the upper end of drive rod 72 comes to abut against stoop 34, continued upward movement of housing 68 together with spider 2 causes the external threads 75 to be guided in helical recesses 76, thereby imposing a rotational movement on member 74, so that member 74 is thereby driven downwardly relative to housing 68.

As a result of cooperation of the sawtooth structure at the lower end of member 74 and the upper end of disk 78, this equally causes disk 78, rod 70 and the control rod supported thereby to rotate and to move downwardly relative to housing 68. This rotational movement is not impeded by spring 24 since, as is apparent from FIG. 5, the upper end of spring 24 will slide along the inclined surfaces at the lower end of disk 78. The lower end of spring 24 is seated in a bore formed at the bottom of the chamber defined by housing 68, so that spring 24 is itself prevented from rotating. However, spring 24 will be axially depressed by the downward movement of disk 78 relative to housing 68.

According to one exemplary embodiment of the invention, drive rod 72, threads 75 and receses 76 are dimensioned to cause the rod rotation system to undergo a rotation of between 90 and 180 degrees as the spider moves to its fully retracted position.

Then, as the spider is subsequently moved downwardly away from the retracted position, spring 24 becomes active to urge disk 78 upwardly relative to housing 68. This produces an upward force on member 74 which causes member 74 to move upwardly relative to housing 68 while threads 75 travel along recesses 76 in order to also rotate member 74. However, during this movement, the upper end of spring 24 will come to abut against one of the vertical surfaces of the sawtooth structure at the lower end of disk 78, whereupon further rotation of disk 78 and support rod 70 will be prevented and the sloping surfaces of the sawtooth structure at the lower end of member 74 will be forced to slide along the sloping surfaces at the upper end of disk 78. At the end of this return movement, member 74 and disk 78 will again be in the positions shown in FIG. 5, but disk 78, support rod 70 and the control rod supported thereby will have undergone a net rotation of 90°. While FIG. 5 illustrates sawtooth structures, each composed of 4 teeth, it will be appreciated that a different number of teeth can be provided, if desired, and the inclination of threads 75 and helical recesses 76 can be varied in order to produce a different amount of rotation during each retraction movement of the spider.

It will be noted that in the normal operating position shown in FIG. 5, when the spider assembly is spaced from its retracted position, each vertical surface of the sawtooth at the bottom of member 74 is spaced circumferentially from the associated vertical surface of the sawtooth structure at the top of disk 78. This spacing is provided to assure that, when member 74 is being urged upwardly relative to housing 68 by the action of spring 24, member 74 will come to rest at a position where the vertical surfaces of its associated sawtooth structure will be properly positioned relative to the vertical surfaces of the sawtooth structure at the top of disk 78 to produce the next 90° rotation of disk 78 and the components secured thereto.

A significant advantage of this structure is that very little machining must be carried at the interior of housing 68. In effect, the only machining required is the formation of a small diameter bore at the bottom of the chamber enclosed by housing 68 and the machining of helical grooves 76 near the open top of housing 68. The machining of such grooves at that location is a relatively simple matter.

Figure 6:
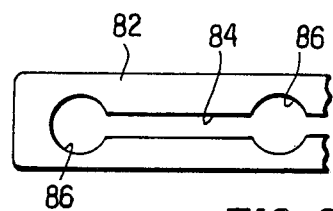
FIG. 6 is a detail plan view illustrating one type of guide structure with which an arrangement according to the invention can be employed.
Figure 7:
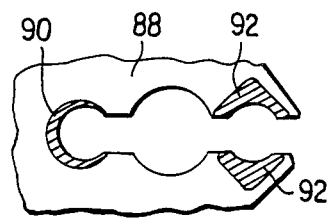
FIG. 7 is a view similar to that of FIG. 6 illustrating a second type of guide structure.

FIGS. 6 and 7 are detail plan views illustrating portions of two types of guide arrangements which can be employed for guiding rods 4 primarily during movement in the upper internals of the reactor pressure vessel. Such guide arrangements are fixed in the pressure vessel so that the rods move vertically therepast.

FIG. 6 illustrates a portion of one guide card which can be employed for guiding the rods of a rod cluster control. A complete card can be in the form of a cruciform structure, one arm of which is illustrated. This card is compared simply of a plate 82 having a central slot 84 for passage of an arm of spider 2, and accurate openings 86. Each opening 86 guides a respective rod, so that the total number of openings 86 is a card 82 will equal the number of rods carried by spider 2 of FIG. 1. Plate 82 is of a suitable metal and of a suitable thickness, for example 3.7 cm.

The openings 86 are slightly larger in diameter than the rods 4 which they guide so that, as a general rule, each rod 4 bears against a particular part of the periphery of its associated opening 86, at which location the rod 4 will be subject to wear. When rod 4 is rotated, the portion of its surface which bears against the particular part of opening 86 changes.

Typically, a number of, e.g. five, cards or plates, 82 is provided, the cards being spaced apart vertically along the upper portion of the pressure vessel interior.

FIG. 7 illustrates a similar portion of a guide arrangement suitable for guiding the rods of a water displacer rod assembly. Here, the guide region is delineated by upper and lower end plates 88 having slots 90 and between which extend, vertically, a plurality of C-tubes, such as 92, and a plurality of half-tube assemblies, such as 94. Each tube 92 and assembly 94 guides a respective water displacer rod. As shown, each assembly 94 is composed of two tube sections each coextensive with less than half the diameter of an associated rod.

Here, again, the internal diameter of tubes 92 and assemblies 94 are slightly less than the diameters of rods 4 so that each rod will tend to bear against a particular part of its associated tube or half-tube assembly.

In the case of water displacement rods, the above-described rotation will have the effect of renewing the locations at which the guide sections or cards bear against the rod surfaces, so that the locations where wear occurs will be varied. The new contact surfaces on each rod 20 will previously have become oxidized to form a hard zirconium layer which serves to retard wear.

The magnitude of each rotation step, for example 45 degrees, can be selected to take advantage of the longitudinal growth of zircalloy due to fast fluence effects while the rods are in the reactor core. As a result, even after the rods have undergone a rotation of 360 degrees, the new wear locations will not coincide with the locations which existed prior to the full 360 degrees of rotation. Moreover, the resulting helical wear paths will have a less significant effect on the longitudinal strength of the control rods.

In the case of rod cluster control, the magnitude of each rotation step can be selected to renew the contact surfaces, and also to keep the wear lines symetrically located. This will reduce any effect which the wear lines may have upon bowing of the control rods.

It will be understood that the above description of the present invention is susceptible to various modifications, changes and adaptations, and the same are intended to be comprehended within the meaning and range of equivalents of the appended claims.

I claim:

1. In a nuclear reactor including a core, a plurality of cylindrical control rods, a single support means supporting said plurality of control rods from their upper ends in spaced apart positions and movable for displacing said control rods in their longitudinal direction between a first end position in which said control rods are fully inserted into said core and a second end position in which said control rods are retracted from said core, and guide means contacting discrete regions of the outer surface of each said control rod at least when said control rods are in the vicinity of the second end position, said control rods being supported by said support means for longitudinal movement without rotation into and out of said core relative to the guide means to thereby cause the outer surface of said control rods to experience wear as a result of sliding contact with the guide means, said support means being so arranged with respect to said core and said guide means that it is incapable of rotation relative to said guide means, the improvement comprising a plurality of displacement means each of said plurality of displacement means being operatively coupled to a respective one of said control rods for periodically rotating said control rod in a single angular direction through an angle selected to change the locations on the outer surfaces of said control rods at which said control rods are contacted by said guide means during subsequent longitudinal movement of said control rods.

2. A reactor as defined in claim 1 wherein said displacement means are operative for effecting such periodic rotation of said control rods each time said control rods are brought to the second end position.

3. A reactor as defined in claim 2 wherein said control rods are associated with said support means to enable said control rods to undergo a limited movement relative to said support means, in the longitudinal direction of said control rods, when said control rods are brought to the second end position, and said displacement means effect rotation of said control rods in response to such limited movement.

4. A reactor as defined in claim 3 wherein said displacement means comprise a camming mechanism coupling each said control rod to said support means for effecting the periodic rotation of each said control rod, whereby the periodic rotation is relative to said support means.

5. A reactor as defined in claim 4 wherein said displacement means periodically rotate each said control rod through an angle of the order of 45°.

6. A reactor as defined in claim 3 wherein, for each said control rod, said displacement means comprise a first member structurally separate from said control rod and mounted in said support means to undergo rotation and vertical movement relative to said support means when said control rod is brought to the second end position, and a drive member carried by said control rod and arranged to undergo rotation, in response to rotation of said first member, in a first direction during movement of the control rod to the second end position.

7. A reactor as defined in claim 6 wherein, for each said control rod, said displacement means further comprise a compression spring interposed between said control rod and said support means for urging said control rod upwardly relative to said support means while permitting movement of said rod relative to said support means in the longitudinal direction of said rod when said rod is in the vicinity of said second end position.

8. A reactor as defined in claim 7 wherein said spring is operatively associated with said drive member for blocking rotation of said drive member in the direction opposite to said first direction.

9. A reactor as defined in claim 1 wherein said displacement means are operative for rotating said control rods while said reactor remains in operation.

* * * * *